United States Patent
Bickham

(10) Patent No.: US 6,985,662 B2
(45) Date of Patent: Jan. 10, 2006

(54) DISPERSION COMPENSATING FIBER FOR MODERATE DISPERSION NZDSF AND TRANSMISSION SYSTEM UTILIZING SAME

(75) Inventor: Scott R. Bickham, Corning, NY (US)

(73) Assignee: Corning Incorporated, Corning, NY (US)

( * ) Notice: Subject to any disclaimer, the term of this patent is extended or adjusted under 35 U.S.C. 154(b) by 63 days.

(21) Appl. No.: 10/696,929

(22) Filed: Oct. 30, 2003

(65) Prior Publication Data
US 2005/0094955 A1   May 5, 2005

(51) Int. Cl.
G02B 6/22 (2006.01)

(52) U.S. Cl. ..................................... 385/127; 385/123

(58) Field of Classification Search ............... 385/123, 385/124, 126, 127
See application file for complete search history.

(56) References Cited

U.S. PATENT DOCUMENTS

| | | | |
|---|---|---|---|
| 4,629,485 A | 12/1986 | Berkey ........................ 65/3.11 |
| 6,376,987 B1 | 4/2002 | Amemiya et al. .......... 313/586 |
| 6,396,987 B1 * | 5/2002 | de Montmorillon et al. ............................ 385/123 |
| 6,453,101 B1 | 9/2002 | Rousseau et al. .......... 385/123 |
| 6,493,494 B1 | 12/2002 | Rousseau et al. .......... 385/123 |
| 6,507,689 B2 | 1/2003 | Tirloni et al. ............... 385/127 |
| 6,535,676 B1 | 3/2003 | de Montmorillon et al. ............................ 385/123 |
| 6,546,177 B1 | 4/2003 | Matsuo et al. .............. 385/123 |
| 6,574,407 B2 * | 6/2003 | Sillard et al. ............... 385/123 |
| 6,577,800 B2 | 6/2003 | Sarchi et al. ................ 385/123 |
| 6,597,848 B1 | 7/2003 | Berkey et al. .............. 385/124 |
| 6,612,756 B1 | 9/2003 | Sillard et al. ............... 398/148 |
| 6,614,973 B2 | 9/2003 | de Montmorillon et al. ............................ 385/123 |
| 6,625,362 B2 | 9/2003 | Inagaki et al. .............. 385/127 |
| 6,628,873 B1 | 9/2003 | Sillard et al. ............... 385/124 |
| 6,668,120 B2 * | 12/2003 | Sillard et al. ............... 385/123 |
| 2001/0033724 A1 | 10/2001 | Kato et al. .................. 385/123 |
| 2002/0012509 A1 | 1/2002 | Mukasa ...................... 385/123 |
| 2002/0012510 A1 | 1/2002 | Jiang et al. ................. 385/123 |

(Continued)

FOREIGN PATENT DOCUMENTS

| EP | 1 107 028 | 6/2001 |
| WO | 03/027737 | 4/2003 |

OTHER PUBLICATIONS

Pending U.S. Appl. No. 10/631,448 entitled "Non-Zero Dispersion Shifted Optical Fiber Having Large Effective Area, Low Slope and Low Zero Dispersion", filed Jul. 30, 2003.

Primary Examiner—Rodney Bovernick
Assistant Examiner—Mike Stahl
(74) Attorney, Agent, or Firm—Randall S. Wayland

(57) ABSTRACT

A dispersion compensating optical fiber includes a segmented core having a central core segment, a moat segment and a ring segment. The refractive index profile is selected to provide a total dispersion at 1550 nm of between −114 and −143 ps/nm/km, and a kappa, defined as the total dispersion at 1550 nm divided by the dispersion slope at 1550 nm, of between 96 and 150 nm. Optical transmission systems including the present invention dispersion compensating optical fiber optically coupled to a moderate dispersion single mode transmission fiber having dispersion at 1550 nm of between 5 and 14 ps/nm/km are also disclosed. Example transmission systems preferably exhibit residual dispersion over the C+L wavelength band (1525 to 1625 nm) of less than +/−20 ps/nm per 100 km of the moderate dispersion transmission fiber and less than +/−10 ps/nm per 100 km of the moderate dispersion transmission fiber over the C band (1525 to 1565 nm).

21 Claims, 10 Drawing Sheets

U.S. PATENT DOCUMENTS

| | | |
|---|---|---|
| 2002/0097971 A1 | 7/2002 | Mukasa et al. ............. 385/124 |
| 2002/0164139 A1 * | 11/2002 | Saitou et al. ............... 385/127 |
| 2002/0168159 A1 | 11/2002 | Takahashi et al. .......... 385/123 |
| 2002/0197036 A1 | 12/2002 | Kim et al. .................. 385/123 |
| 2003/0021562 A1 | 1/2003 | Kumano ..................... 385/123 |
| 2003/0059186 A1 | 3/2003 | Hebgen et al. ............. 385/127 |
| 2003/0063881 A1 | 4/2003 | Hebget et al. ............. 385/127 |
| 2003/0081889 A1 | 5/2003 | Akasaka et al. .............. 385/24 |
| 2003/0081921 A1 | 5/2003 | Sillard et al. ............... 385/124 |
| 2003/0095769 A1 * | 5/2003 | Aikawa et al. ............. 385/127 |
| 2003/0128943 A1 | 7/2003 | Hebgen et al. ............. 385/123 |
| 2003/0147610 A1 | 8/2003 | Tsukitani et al. ........... 385/127 |
| 2003/0147612 A1 | 8/2003 | Jiang et al. ................ 385/127 |
| 2003/0156810 A1 | 8/2003 | Matsuo et al. .............. 385/127 |
| 2003/0174987 A1 | 9/2003 | Bickham et al. ............ 385/127 |

* cited by examiner

DISPERSION COMPENSATING FIBER FOR MODERATE DISPERSION NZDSF AND TRANSMISSION SYSTEM UTILIZING SAME

BACKGROUND OF THE INVENTION

1. Field of the Invention

The present invention relates generally to optical fiber, and more particularly to dispersion compensating optical fibers and systems including the same.

2. Technical Background

Increased demand for higher bit transmission rates has resulted in a large demand for optical transmission systems that can control and minimize dispersion effects. Analysis of common optical transmission systems indicates that while optical transmission systems can tolerate fairly large amounts of residual dispersion at 10 Gbit/second, these systems can tolerate only small amounts of residual dispersion at higher transmission rates of about 40 Gbit/second without causing unwanted signal distortion. Therefore, it is of the utmost importance to accurately control dispersion in such high bit-rate optical transmission systems across the entire wavelength band of interest.

In an attempt to address the need for fibers capable of transmission in dual windows (around 1310 and 1550 nm), new transmissions fibers have been developed having dispersion in the range from about 5 to 14 ps/nm/km at 1550 nm. These so-called moderate dispersion Non-Zero Dispersion Shifted Fibers (NZDSF) preferably have dispersion slopes less than about 0.08 ps/nm$^2$/km at 1550 nm; more preferably in the range of about 0.035 to 0.07 ps/nm$^2$/km at 1550 nm. Further, they preferably exhibit effective areas at 1550 nm of greater than about 45 $\mu$m$^2$, more preferably between about 50 and 75 $\mu$m$^2$ at 1550 nm, and have $\lambda$o between about 1300 and 1480 nm.

Thus, there is a need for a dispersion compensating fiber useful for compensating accumulated dispersion in spans including such moderate dispersion NZDSF.

SUMMARY OF THE INVENTION

Definitions:

The following definitions and terminology are commonly used in the art.

Refractive index profile—The refractive index profile is the relationship between the relative refractive index ($\Delta$%) and the optical fiber radius in microns (as measured from the centerline (CL) of the optical fiber).

Segmented core—A segmented core is one that includes multiple segments in the physical core, such as a first and a second segment, for example, including any two of the following: a central core segment, a moat segment, and a ring segment. Each segment has a respective relative refractive index profile having maximum and minimum relative refractive indices therein.

Effective area—The effective area is defined as:

$$A_{\textit{eff}} = 2\pi (\int E^2 r dr)^2 / (\int E^4 r dr),$$

wherein the integration limits are 0 to $\infty$, and E is the electric field associated with the propagated light as measured at 1550 nm.

Relative refractive index percent $\Delta$%—The term $\Delta$% represents a relative measure of refractive index defined by the equation:

$$\Delta\% = 100 \times (n_i^2 - n_c^2)/2n_i^2$$

where $\Delta$% is the maximum (or minimum in the case of a moat) refractive index of the index profile segment measured relative to the refractive index of the clad layer $n_c$.

Alpha-profile—The term alpha-profile refers to a shape of the relative refractive index profile of the central core segment expressed in terms of $\Delta(b)$% where b is the radius, and which follows the equation:

$$\Delta(b)\% = \{\Delta b_0 (1 - [|b - b_0|/(b_1 - b_0)]^\alpha\} \times 100,$$

where $b_0$ is the maximum point of the profile of the core and $b_1$ is the point at which $\Delta(b)$% is zero and b is the range of $b_i$ less than or equal to b less than or equal to $b_f$, where $\Delta$% is defined above, $b_i$ is the initial point of the alpha-profile, $b_f$ is the final point of the alpha-profile, and alpha is an exponent which is a real number. The central core segment profile may include an offset in that the radius $b_0$ may start at a point which is offset from the fiber's centerline.

Pin array macro-bending test—This test is used to test compare relative resistance of optical fibers to macro-bending. To perform this test, attenuation loss is measured at 1550 nm when the optical fiber is arranged such that no induced bending loss occurs. This optical fiber is then woven about the pin array and attenuation again measured at the same wavelength. The loss induced by bending is the difference between the two attenuation measurements (in dB). The pin array is a set of ten cylindrical pins arranged in a single row and held in a fixed vertical position on a flat surface. The pin spacing is 5 mm, center-to-center. The pin diameter is 0.67 mm. The optical fiber is caused to pass on opposite sides of adjacent pins. During testing, the optical fiber is placed under enough tension sufficient to make to the optical fiber conform to a portion of the periphery of the pins.

Lateral load test—The lateral load test provides a measure of the micro-bending resistance of the optical fiber. In this test, a length of optical fiber is placed in one loop of 98.5 mm diameter and sandwiched between two flat plates. A No. 70 wire mesh is attached to one of the plates. The length of optical fiber is sandwiched between the plates and the reference attenuation is measured while the plates are pressed together with a force of 30 newtons. A 70 newton force is then applied to the plates and the increase in attenuation and dB/m is measured. This increase in attenuation is the lateral load attenuation (dB/m) of the optical fiber.

According to embodiments of the invention, a dispersion compensating optical fiber is provided with a relative refractive index profile having a central core segment with a positive relative refractive index ($\Delta_1$) and an core outer radius ($r_1$), a moat segment surrounding the central core segment having a negative relative refractive index ($\Delta_2$) and a moat outer radius ($r_2$), and a ring segment surrounding the moat segment having a positive relative refractive index ($\Delta_3$), and a ring center radius ($r_3$) to the center of the ring segment wherein the relative refractive index profile results in a total dispersion of less than −114 ps/nm/km and greater than −143 ps/nm/km at 1550 nm, and a kappa, defined as the total dispersion at 1550 nm divided by total dispersion slope at 1550 nm, of between 96 and 150 nm. According to further embodiments, the total dispersion is preferably less than −120 ps/nm/km and greater than −143 ps/nm/km at 1550 nm; more preferably less than −120 ps/nm/km and greater than −138 ps/nm/km at 1550 nm.

In accordance with further embodiments of the invention, the dispersion compensating fiber preferably includes a relative refractive index profile having a central core segment with a relative refractive index ($\Delta_1$) between 2.0% and 1.5% and an outer radius ($r_1$) of between 1.6 and 1.8 μm, a moat segment surrounding the central core segment with a relative refractive index ($\Delta_2$) of between −0.4 and −0.6% and a moat outer radius ($r_2$) between 4.6 and 5.0 μm, and a ring segment surrounding the moat segment with a relative refractive index ($\Delta_3$) of between 0.3 and 0.6% and a ring radius ($r_3$) to a center of the ring segment of between 6.5 and 7.2 μm, wherein the relative refractive index profile results in a total dispersion of less than −114 ps/nm/km and greater than −143 ps/nm/km at a wavelength of 1550 nm, and a kappa, defined as the total dispersion at 1550 nm divided by the dispersion slope at 1550 nm, of between 96 and 150 nm.

According to further embodiments of the invention, the dispersion compensating optical fiber described herein is preferably included in an optical transmission system and is optically coupled to a moderate dispersion NZDSF having a total dispersion between about 5 and 14 ps/nm/km at 1550 nm. The optical transmission system preferably exhibits a residual dispersion of less than ±10 ps/nm per 100 km of the moderate dispersion NZDSF over the wavelength band from 1525–1565 nm (over the C-band); more preferably less than or equal to ±7 ps/nm per 100 km. In accordance with further embodiments including the combination of a moderate dispersion transmission fiber and the dispersion compensating fiber described herein, the residual dispersion for the span is preferably less than or equal to ±20 ps/nm per 100 km of the moderate dispersion NZDSF over the wavelength band from 1525–1625 nm (the C+L band); and more preferably less than or equal to ±15 ps/nm per 100 km. The dispersion compensating fiber in accordance with the invention is preferably included within a dispersion compensating module.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

DETAILED DESCRIPTION OF THE PREFERRED EMBODIMENTS

Figure 1:
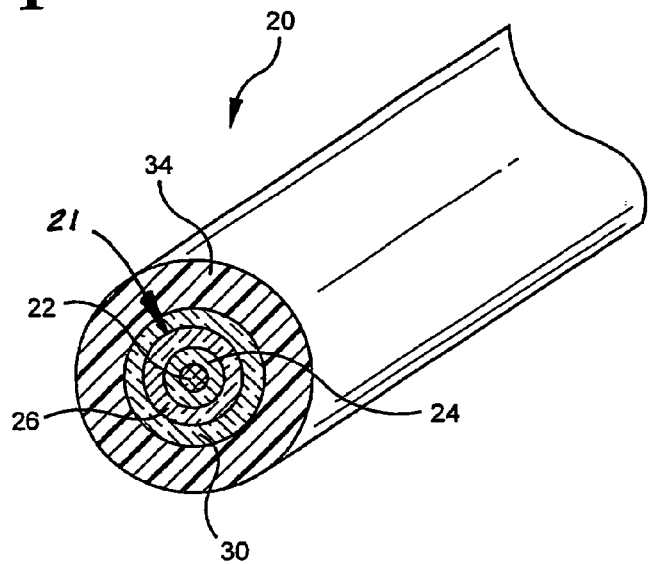
FIG. 1 is a cross-sectional isometric view of the dispersion compensating fiber in accordance with embodiments of the present invention.

Reference will now be made in detail to the present preferred embodiment(s) of the invention, examples of which are illustrated in the accompanying drawings and tables. Whenever possible, the same reference numerals will be used throughout the drawings to refer to the same or like parts.

A family of the dispersion compensating optical fibers (otherwise referred to as dispersion compensating optical fibres or dispersion compensating waveguide fibers) in accordance with the present invention are shown and described with reference to FIGS. 1 and 4–12; such fibers being designated generally throughout by the reference numeral 20. The dispersion compensating fibers 20 described and disclosed herein have a segmented core structure. The segments (e.g., the central core segment, moat segment and ring segment) collectively define a relative refractive index profile for the physical core of the fiber. The relative refractive index profile of the fiber is further described and defined by the various relative refractive index percents, $\Delta_1$, $\Delta_2$, $\Delta_3$, representative radii, $r_1$, $r_2$, $r_3$, $r_i$, $r_o$ the ring width, Wr, and the ring offset, Xo for the various segments. Radii for the various segments are all measured from the optical fiber's longitudinal axis center line, CL. As is conventional, the relative refractive index profile preferably does not change substantially along the longitudinal length of the fiber, and is preferably generally symmetrical about the fiber's centerline, CL.

Referring now to FIGS. 1 and 4–12, each of the dispersion compensating fibers 20 according to embodiments of the invention includes a physical structure including a physical core 21 and a clad layer 30 surrounding the core; the clad layer 30 surrounding and abutting the physical core has a refractive index of $n_c$. According to embodiments of the invention, the segmented core 21 of the family of dispersion compensating fibers 20 herein further includes a central core segment 22 closest to the fiber's centerline, CL, a moat segment 24 having a generally annular shape surrounding and contacting the central core segment 22, and an annular ring segment 26 surrounding and contacting the moat segment 24. Annular clad layer 30, which is preferably undoped silica, surrounds and abuts the ring segment 26. Clad layer 30 preferably has an outer radius of about 62.5 microns (although the various refractive index plots are shown truncated at about 10 microns, not showing the remaining 52.5 microns for clarity). The outermost radial glass portion of clad layer 30 of the fibers 20 are preferably covered (coated) with a protective polymer coating 34, which is preferably UV curable, to an outside diameter of about 250 $\mu$m. The polymer coating 34 is preferably a two-modulus acrylate coating having a softer-modulus inner primary coating and a harder-modulus secondary outer coating, as is conventional. However, it should be recognized that any suitable fiber coating may be employed.

Figure 4:
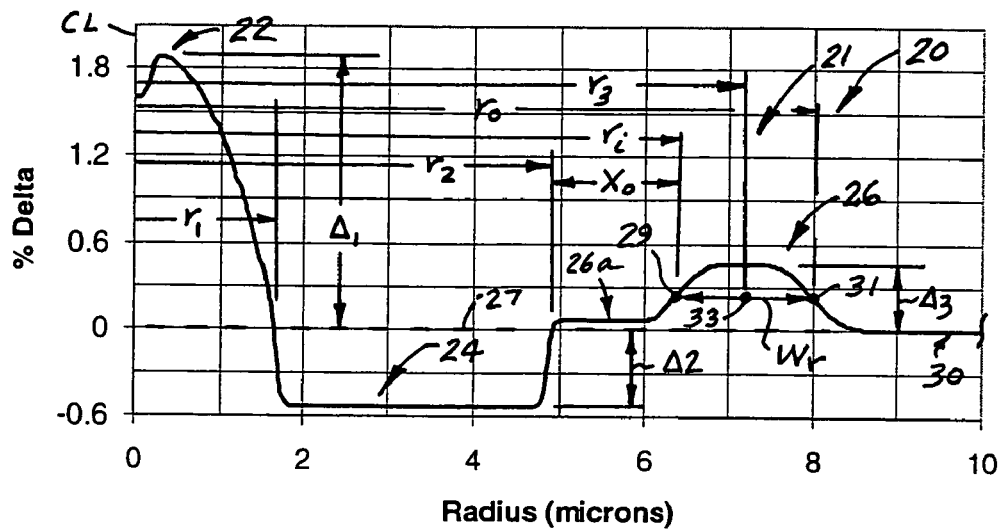
FIG. 4 is a plot of a relative refractive index profile (Delta % vs. Radius (μm)) of a first embodiment (example a) of the dispersion compensating fiber in accordance with the invention.

A relative refractive index profile for a first embodiment of dispersion compensating fiber 20 according to the invention is illustrated in FIG. 4. Variations of the profile of FIG. 4 are shown in FIGS. 5–12 and help describe the family of fibers 20 claimed herein. FIG. 4 shows relative refractive index (in percent) charted versus the fiber radius (in microns). Further, FIG. 4 illustrates the conventions used throughout for the deltas, $\Delta_1$, $\Delta_2$, $\Delta_3$, representative radii, $r_1$, $r_2$, $r_3$, $r_o$, $r_i$, ring width, Wr, and ring offset, Xo. The same conventions are used to characterize the relative refractive index profiles for example b–i shown in FIGS. 5–12, and will not be repeated therein for clarity.

As best shown in FIGS. 4–12, the physical core 21 for each fiber 20 of the family of dispersion compensating fibers in accordance with the invention preferably have a central core segment 22 having a maximum relative refractive index percent, $\Delta_1\%$, measured from the cladding reference line 27 of preferably greater than 1.0% and less than 2.0%; more preferably greater than 1.5% and less than 2.0%; and most preferably of within the range from about 1.55% to 1.95%. Further, preferably the central core segment 22 has an alpha profile with an alpha, $\alpha$, preferably less than 5.0; more preferably less than 3.0; and most preferably about 2.0. As shown, the point of maximum refractive index of the central core segment 22 may be offset a distance (0.1 to 0.5 $\mu$m) from the fiber's centerline, CL. Preferably, the central core segment 22 exhibits an outer radius, $r_1$, preferably between 1.6 and 1.8 $\mu$m; more preferably within the range of from about 1.65 and 1.75 $\mu$m. Outer radius, $r_1$, of the central core segment 22 is measured to, and defined by, the intersection of the descending leg of the relative refractive index profile of the central core segment 22 with the horizontal axis extension 27 corresponding to, and extending from, the index of the cladding layer 30, which is preferably constructed of pure silica. The refractive index profile of the central core segment 22 is preferably formed by doping silica with a sufficient amount of germania such that its index of refraction is raised and, therefore, provides the desired $\Delta_1\%$ and alpha profile.

An annular moat segment 24 of the dispersion compensating fiber 20 preferably surrounds, and is in contact with, the central core segment 22 and, preferably, has a negative minimum relative refractive index percent, $\Delta_2\%$. $\Delta_2\%$ is preferably more negative than −0.3%; and more preferably within the range from about −0.4 to −0.6% as measured relative to cladding 30. Furthermore, the moat segment 24 has a width, defined herein as $r_2-r_1$, of preferably between 2.5 to about 3.5 $\mu$m. The bottom of the moat segment 24 preferably includes a flat portion, preferably of substantially constant index which is at least 2 $\mu$m in length. Outer radius, $r_2$, of the moat segment 24 is measured to the intersection of the moat segment 24 and the ring segment 26. In particular, the outer radius, $r_2$, is measured to, and defined by, the intersection of the ascending outer leg of the profile of the moat segment 24 with the horizontal axis 27 corresponding to the refractive index of the cladding layer 30 (preferably pure silica). The outer radius, $r_2$, of the moat segment 24 is preferably located between about 4.6 and 5.0 $\mu$m from the fiber's centerline, CL. Moat segment 24 is preferably formed by doping silica with fluorine in an amount sufficient to reduce the refractive index thereof relative to the cladding 30 in the amount to achieve the desired relative refractive index, $\Delta_2\%$, of the moat segment 24. U.S. Pat. No. 4,629,485 teach one suitable method for fluorine doping an optical fiber preform. Optionally, other suitable glass modifiers other than fluorine which lower the refractive index may also be employed.

Preferably surrounding and abutting the moat segment 24 is an annular ring segment 26 of the dispersion compensating fiber 20. The raised-index ring segment 26 preferably has a relative refractive index percent, $\Delta_3\%$, of greater than about 0.3%; preferably between about 0.3 and 0.6%; and more preferably of within the range of from about 0.44% and 0.51%. Ring segment 26 has a half-height width dimension, Wr, preferably within the range of from 1.0 $\mu$m to about 2.0 $\mu$m, measured from inner side point 29 to outer side point 31. Ring center radius, r3, is measured from the fiber centerline, CL, to the bisection point, 33, of the width, Wr. Preferably, the radius, r3, is between about 6.5 $\mu$m to about 7.2 $\mu$m. The ring width, Wr, is equal to $r_o-r_i$, where $r_o$ is the dimension from the centerline, CL, to the half height point 31, and, similarly, $r_i$ is the dimension from the fiber centerline, CL, to the half height point 29. The half height points, 29, 31, are measured at, and defined as, the points on the respective ascending and descending legs of the ring segment 26 where the respective delta values equal one-half of $\Delta_3\%$. The ring segment 26 is preferably formed by doping with germania sufficient to up-dope the ring segment relative to the clad layer 30 the desired amount to provide the desired ring profile shape and relative refractive index, $\Delta_3\%$. According to preferred embodiments the invention, the ring segment 26 is preferably offset from the edge of the moat segment 24 by a distance Xo. The offset dimension, Xo, for the dispersion compensation fiber 20 is defined by the relationship:

$$Xo = r_3 - r_2 - Wr/2.$$

The offset, Xo, of the ring segment 26 from the edge of the moat segment 24 is a measure of the amount that the inner side point 29 of the ring segment 26 is offset from the outer edge of the moat segment 24. The offset, Xo, is preferably greater than 0.75 $\mu$m; more preferably greater than 0.9 $\mu$m; more preferably yet between 1.0 and 2.0 $\mu$m; and most preferably between 1.0 and 1.7 $\mu$m. The size of the offset, Xo, may be varied to optimize the dispersion properties the fiber. In some embodiments, the ring segment 24 may preferably includes, positioned inwardly toward the center of the fiber 20, a raised portion 26a having a delta % raised slightly above the level of cladding 30; typically on the order of between 0.04 and 0.1%. This raised portion isolates the ring segment 26 from the moat segment 24 to avoid viscosity mismatch thereby improving perform manufacturability.

The clad layer 30 surrounds and abuts the ring segment 26 and has a relative refractive index percent $\Delta_c\%$ of approximately 0%, and an outer radius of about 62.5 $\mu$m. The clad layer 30 is preferably manufactured from undoped, silica glass. However, it should be understood that the clad layer 30 may be slightly up or down-doped, as well, provided that the relative refractive index profile for the fiber described herein is achieved.

Various embodiments of dispersion compensating fiber 20 are described herein in accordance with the invention and each has a core/moat ratio, defined as the central core radius, $r_1$, divided by the outer moat radius, $r_2$, of preferably greater than 0.32. More preferably, the core/moat ratio is greater than 0.34; and most preferably between 0.34 and 0.38. Furthermore, the moat/ring ratio of the fibers 20, defined as the outer moat radius, $r_2$, divided by the ring center radius, $r_3$, is preferably between 0.60 and 0.75; more preferably between 0.65 to 0.72.

The dispersion compensating fibers 20 according to embodiments of the present invention exhibit the desired optical properties at a wavelength of about 1550 nm to have excellent utility for providing dispersion compensation of accumulated dispersion when used in a system employing a moderate dispersion, NZDSF. Dispersion compensating fibers 20 in accordance with embodiments described herein preferably have total dispersion of less than −114 ps/nm/km and greater than −143 ps/nm/km; more preferably less than −120 ps/nm/km and greater than −143 ps/nm/km at 1550 nm; and more preferably yet less than −120 ps/nm/km and greater than −138 ps/nm/km at 1550 nm. The total dispersion slope at 1550 nm of the fiber 20 is preferably more negative than −0.7 ps/nm$^2$/km; preferably in the range of less than −0.7 ps/nm$^2$/km and greater than −1.5 ps/nm$^2$/km. The preferred kappa, defined as the total dispersion at 1550 nm divided by the total dispersion slope at 1550 nm, for the fibers 20 is preferably less than about 150 nm; more preferably between 96 nm and 150 nm at 1550 nm; more preferably yet between 107 and 146 nm at 1550 nm; and most preferably between 113 and 127 nm at 1550 nm. The effective area of the fibers 20 are preferably greater than or equal to about 15.0 $\mu$m$^2$ at 1550 nm; and the mode field diameter at 1550 nm is preferably 4.4 $\mu$m or greater.

Calculated lateral load bend loss of the fibers 20 at 1550 nm is preferably less than or equal to about 2.0 dB/m, and more preferably of less than or equal to about 1.5 dB/m. Pin array bend loss exhibited by the fibers 20 is calculated to be less than about 20 dB at 1550 nm; more preferably less than 12 dB at 1550 nm; and in some embodiments less than 8 dB at 1550 nm. The dispersion compensating fibers 20 of the present invention further exhibit a preferred theoretical cutoff wavelength of less than about 1900 nm; more preferably less than 1850 nm.

Table 1 below illustrates the modeled (calculated) optical properties for several examples A–I of dispersion compensating fiber 20 in accordance with embodiments of the invention.

TABLE 1

OPTICAL PROPERTIES FOR DISPERSION COMPENSATING FIBERS

Figure 5:
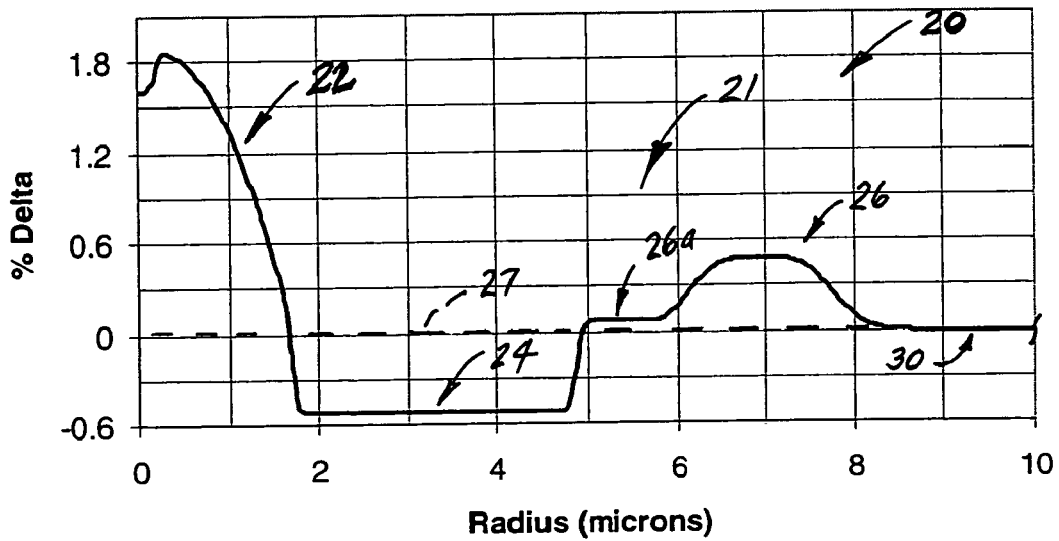
FIGS. 5–12 are plots of alternative relative refractive index profiles for several embodiments (examples b–i) of the dispersion compensating fiber in accordance with the invention.
Figure 6:
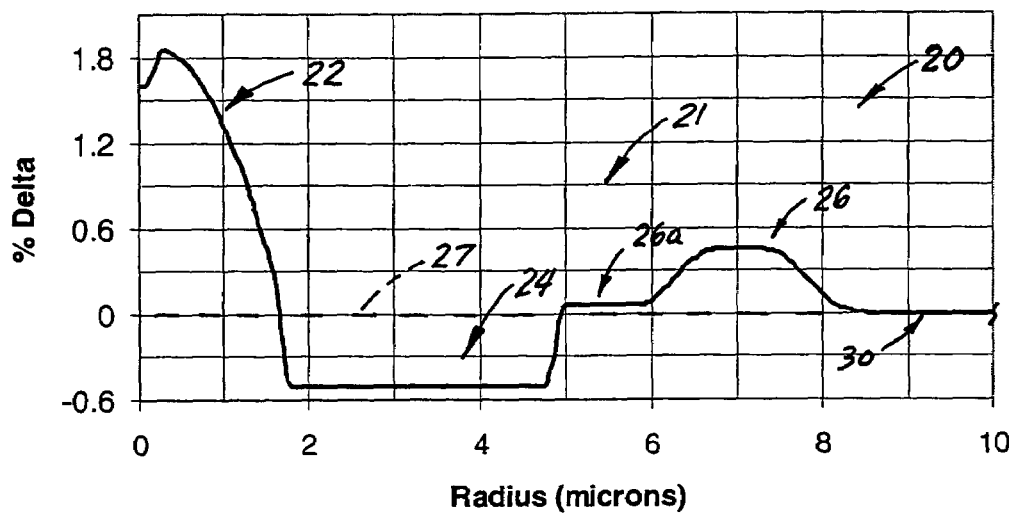
Figure 7:
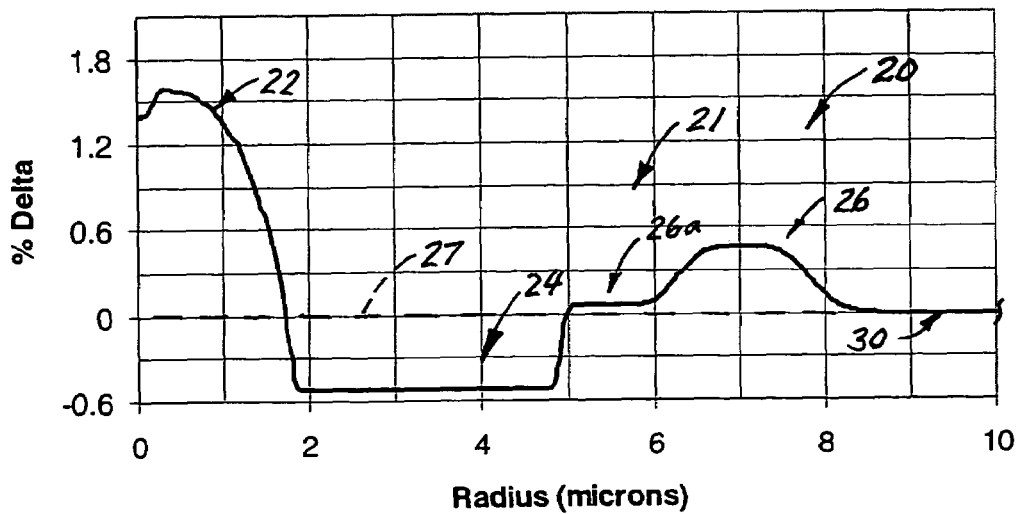
Figure 8:
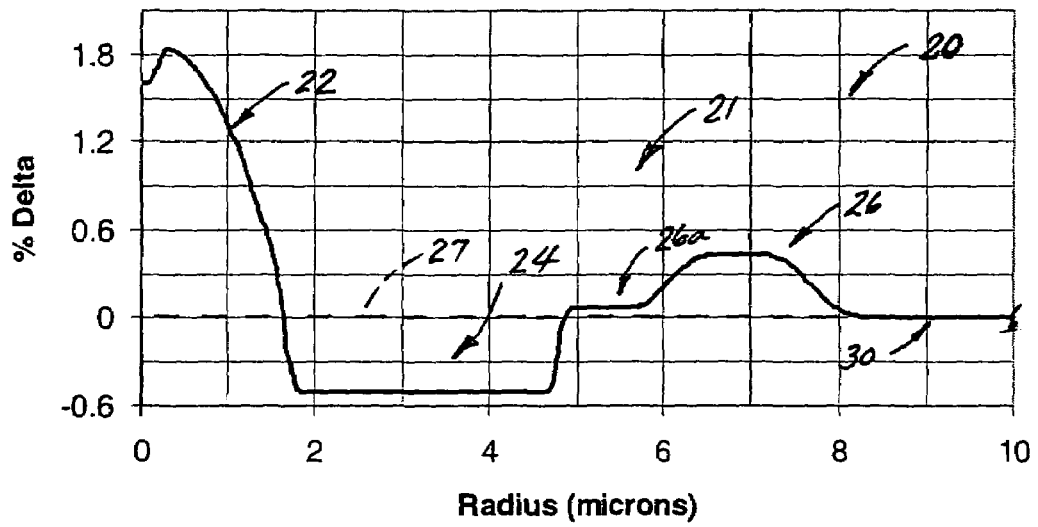
Figure 9:
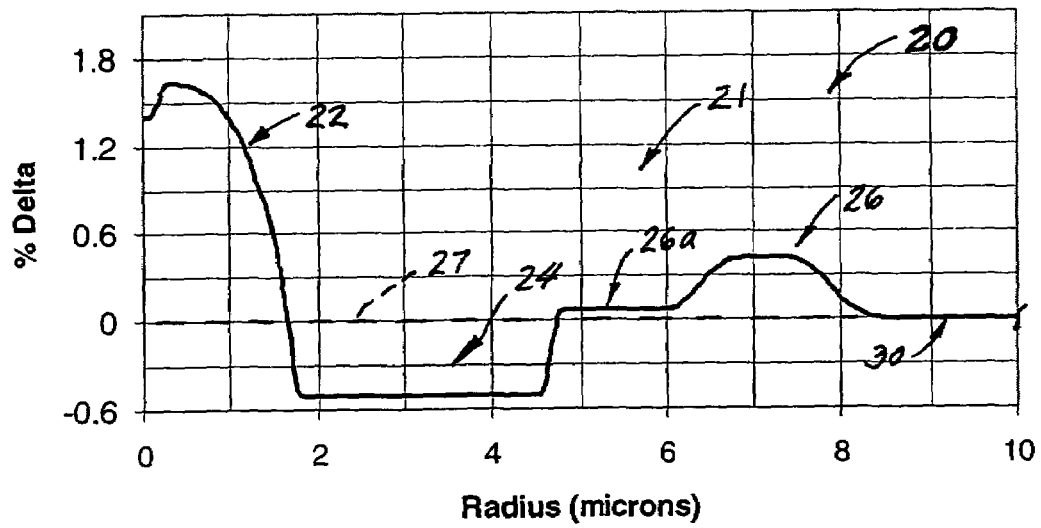
Figure 10:
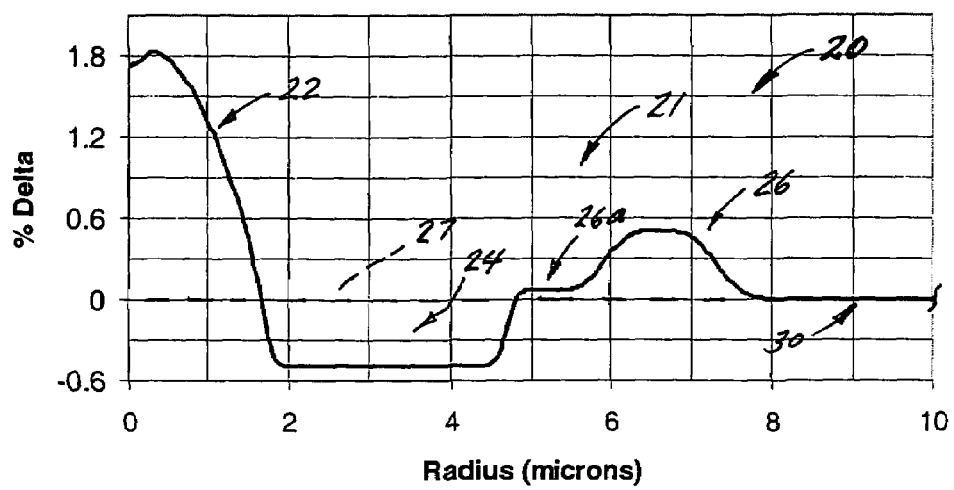
Figure 11:
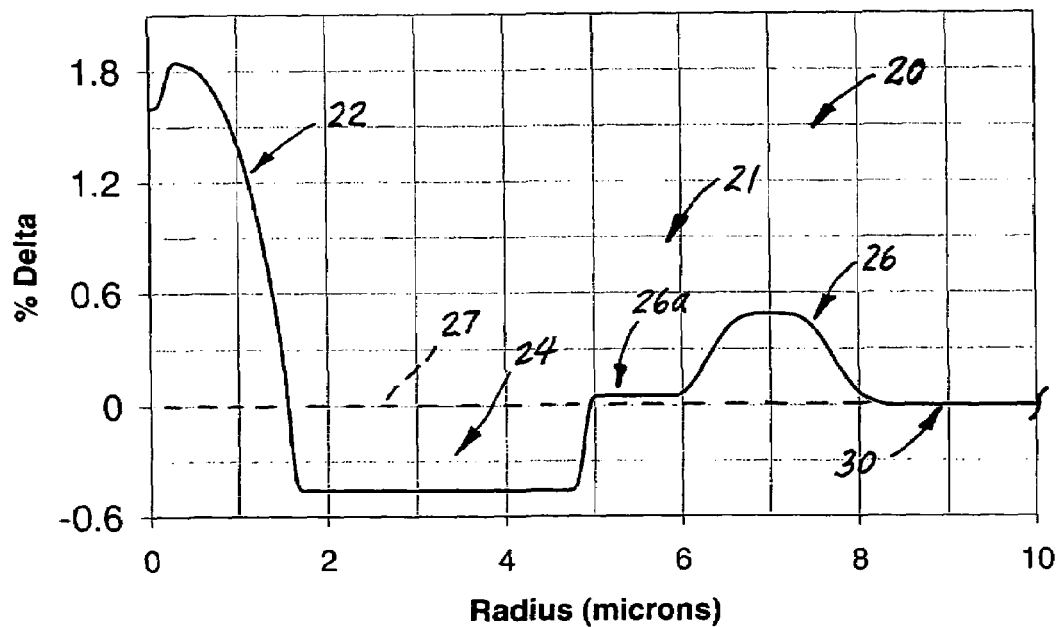
Figure 12:
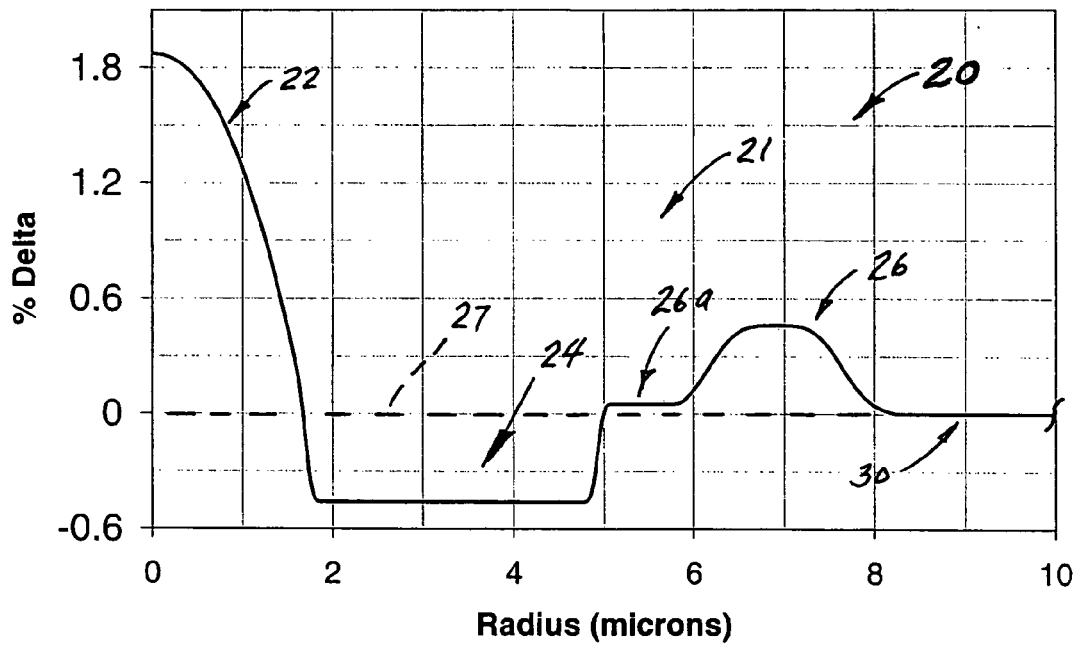

| | EXAMPLE # | | | | | | | | |
|---|---|---|---|---|---|---|---|---|---|
| | A | B | C | D | E | F | G | H | I |
| | | | | | FIG. # | | | | |
| | FIG. 4 | FIG. 5 | FIG. 6 | FIG. 7 | FIG. 8 | FIG. 9 | FIG. 10 | FIG. 11 | FIG. 12 |
| TOTAL DISPERSION (ps/nm/km) @ 1550 nm | −141 | −132 | −139 | −118 | −143 | −127 | −137 | −144 | −128 |
| DISPERSION SLOPE (ps/nm$^2$/km) @ 1550 nm | −1.46 | −1.23 | −1.28 | −1.08 | −1.18 | −1.05 | −0.95 | −1.23 | −1.00 |
| K (nm) @ 1550 nm | 97 | 108 | 109 | 109 | 121 | 120 | 145 | 117 | 129 |
| LATERAL LOAD LOSS @ 1550 NM (dB/m) | 1.29 | 0.88 | 1.31 | 1.24 | 1.30 | 1.22 | 0.92 | 1.30 | 1.28 |
| PIN ARRAY BEND LOSS @ 1550 nm (dB) | 6.9 | 4.7 | 8.0 | 7.6 | 8.8 | 8.4 | 6.8 | 9.3 | 10.5 |
| EFFECTIVE AREA @ 1550 nm ($\mu$m$^2$) | 15.5 | 15.7 | 16.2 | 17.0 | 16.7 | 16.9 | 17.2 | 16.1 | 16.9 |
| MFD @ 1550 nm ($\mu$m) | 4.42 | 4.46 | 4.51 | 4.62 | 4.57 | 4.61 | 4.62 | 4.57 | 4.62 |
| $\lambda$cth (nm) | 1867 | 1858 | 1815 | 1816 | 1770 | 1770 | 1729 | 1762 | 1711 |

Table 2 below includes dispersion compensating fiber examples A–I in accordance with embodiments of the invention and further defines the physical structure of the relative refractive index profiles of family of fibers 20 that yield optical properties within desired performance ranges.

TABLE 2

Physical Structure of Example Fibers A–I

| | EXAMPLE # | | | | | | | | |
|---|---|---|---|---|---|---|---|---|---|
| | A | B | C | D | E | F | G | H | I |
| | FIG. # | | | | | | | | |
| | FIG. 4 | FIG. 5 | FIG. 6 | FIG. 7 | FIG. 8 | FIG. 9 | FIG. 10 | FIG. 11 | FIG. 12 |
| $\Delta_1$ (%) | 1.90 | 1.87 | 1.86 | 1.59 | 1.85 | 1.64 | 1.86 | 1.86 | 1.64 |
| $r_1$ ($\mu$m) | 1.68 | 1.72 | 1.70 | 1.76 | 1.70 | 1.70 | 1.71 | 1.70 | 1.70 |
| $\Delta_2$ (%) | −0.53 | −0.53 | −0.51 | −0.52 | −0.50 | −0.51 | −0.49 | −0.51 | −0.51 |
| $r_2$ ($\mu$m) | 4.89 | 4.90 | 4.89 | 4.95 | 4.80 | 4.68 | 4.71 | 4.89 | 4.68 |
| Moat Width ($\mu$m) | 3.21 | 3.18 | 3.19 | 3.19 | 3.10 | 2.98 | 3.00 | 3.19 | 2.98 |
| $\Delta_3$ (%) | 0.46 | 0.49 | 0.46 | 0.47 | 0.44 | 0.43 | 0.51 | 0.49 | 0.46 |
| $r_3$ ($\mu$m) | 7.17 | 6.93 | 7.04 | 7.04 | 6.85 | 7.12 | 6.59 | 7.01 | 6.91 |
| $r_i$ ($\mu$m) | 6.35 | 6.12 | 6.23 | 6.34 | 6.23 | 6.01 | 5.87 | 6.28 | 6.15 |
| $r_o$ ($\mu$m) | 8.00 | 7.77 | 7.85 | 7.68 | 7.85 | 7.68 | 7.31 | 7.73 | 7.66 |
| Wr ($\mu$m) | 1.65 | 1.65 | 1.63 | 1.34 | 1.63 | 1.67 | 1.44 | 1.45 | 1.51 |
| Xo ($\mu$m) | 1.46 | 1.21 | 1.34 | 1.42 | 1.24 | 1.61 | 1.16 | 1.39 | 1.47 |
| ALPHA | 2.0 | 2.0 | 2.0 | 2.9 | 2.0 | 3.0 | 2.0 | 2.0 | 3.0 |
| CORE-MOAT RATIO | 0.344 | 0.351 | 0.348 | 0.355 | 0.354 | 0.363 | 0.362 | 0.314 | 0.335 |
| MOAT/RING RATIO | 0.68 | 0.71 | 0.70 | 0.70 | 0.70 | 0.66 | 0.72 | 0.70 | 0.68 |

Figure 13:
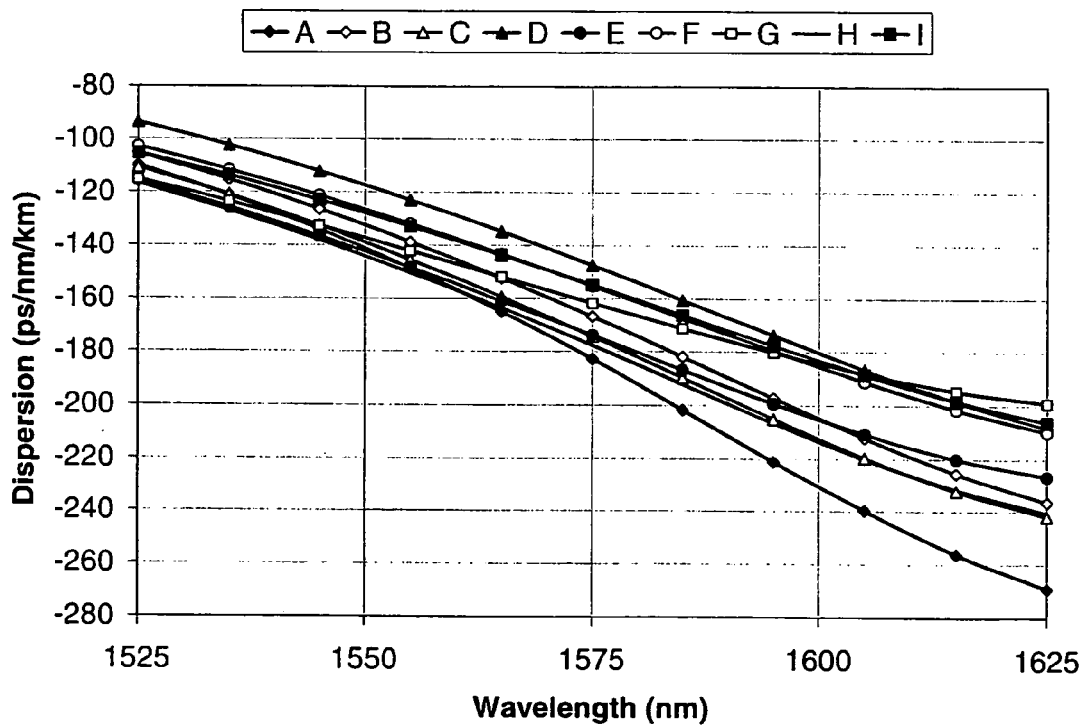
FIG. 13 is a graph of total dispersion (ps/nm/km) versus wavelength (nm) for the dispersion compensating fiber examples A–I according to embodiments of the invention.
Figure 14:
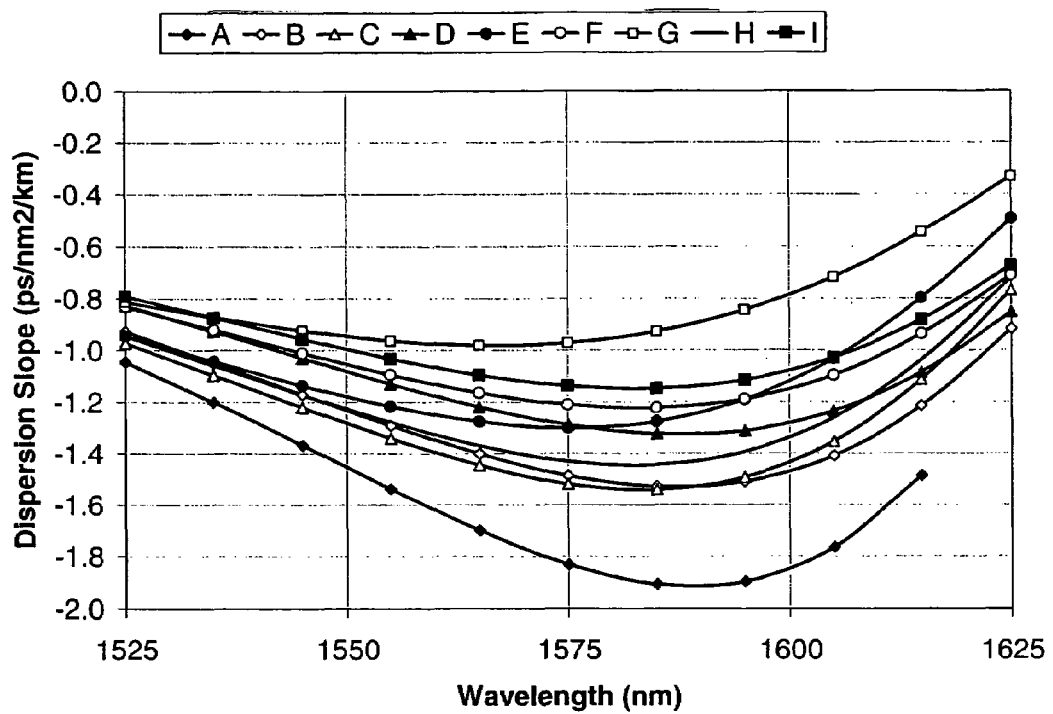
FIG. 14 is a graph of total dispersion slope (ps/nm²/km) versus wavelength (nm) for fiber examples A–I in accordance with embodiments of the invention.
Figure 15:
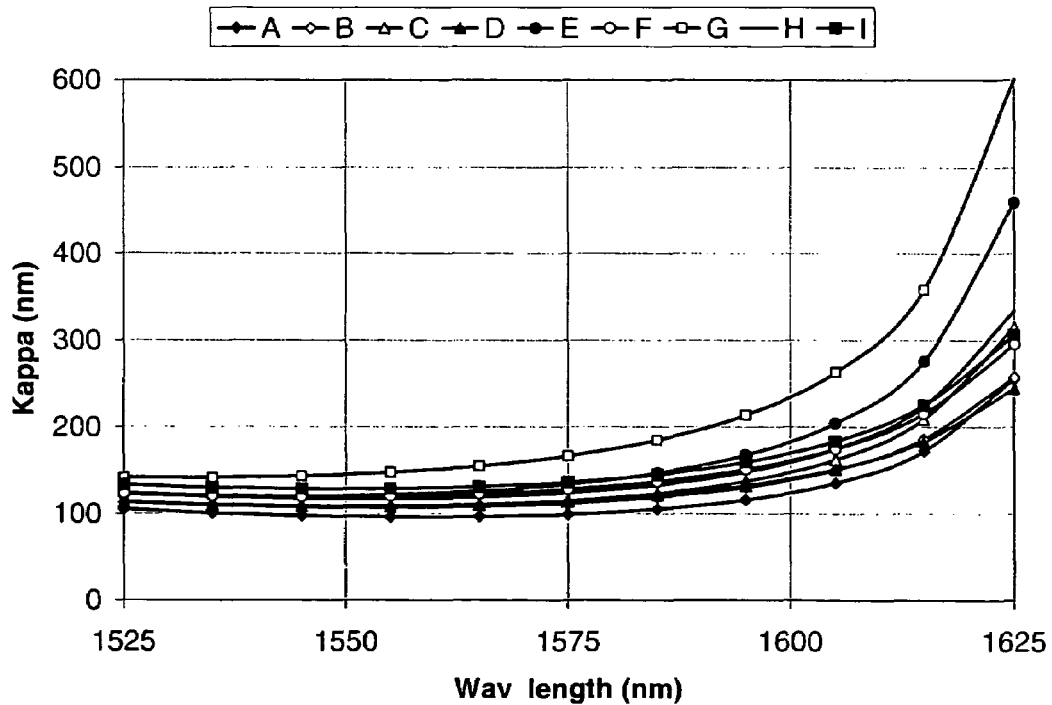
FIG. 15 is a graph of the kappa (nm) versus wavelength (nm) for dispersion compensating fiber examples A–I in accordance with embodiments of the invention.

FIGS. 13–15 illustrate certain optical parameter plots for the dispersion compensating fiber examples A–I. In particular, the plots include total dispersion across the C+L wavelength bands from 1525 to 1625 nm (See FIG. 13), total dispersion slope across the C+L wavelength band from 1525 to 1625 nm (FIG. 14), and kappa across the C+L wavelength band from 1525 to 1625 nm (FIG. 15), respectively, for dispersion compensating fiber examples A–I. Each of the plots is appropriately labeled A–I corresponding to the fiber example number. The wavelength band from 1525 to 1625 nm is generally referred to as the "C+L band," and is one wavelength band of operation for systems employing the dispersion compensating fiber in accordance with the present invention. However, it should be apparent that many of the embodiments of the dispersion compensation fiber 20 in accordance with the invention may be desirably used within other wavelength bands and may be optimized for use in other bands, such as the C band (1525 to 1565 nm). In particular, it should be apparent that examples A, C–D, E–F and G are optimized for operation in the C band, and that examples B, H and I are optimized for operation in the C+L band.

Figure 2:
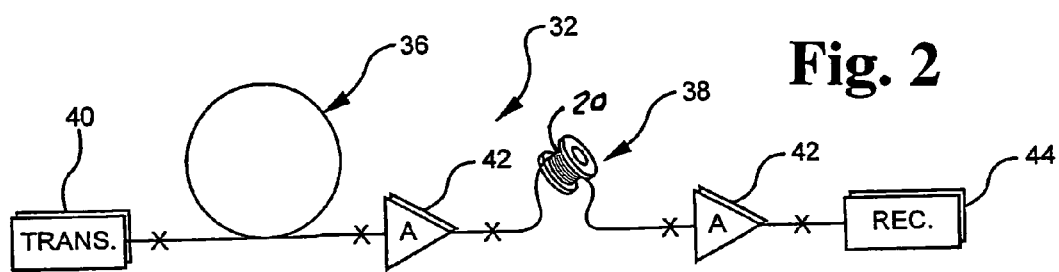
FIGS. 2 and 3 are schematic diagrams of optical transmission systems employing the dispersion compensating fiber in accordance with further embodiments of the invention.
Figure 3:
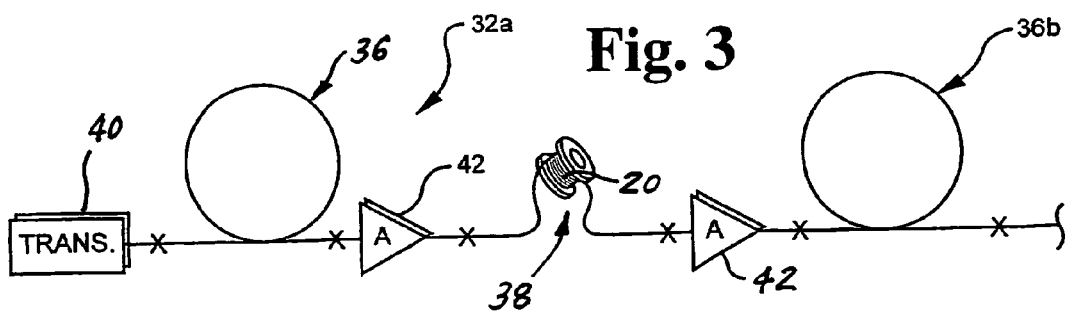

FIGS. 2 and 3 graphically illustrate optical transmission systems 32, 32a employing the dispersion compensating fiber 20 according to the embodiments of the invention described herein. The systems 32, 32a preferably include an optical signal transmitter 40, and a moderate dispersion NZDSF 36 optically coupled to, and in optical communication with, the transmitter 40. The moderate dispersion NZDSF 36 is preferably a single mode fiber having moderate dispersion at 1550 nm. The moderate dispersion NZDSF 36 preferably has a positive total dispersion and positive total dispersion slope at 1550 nm, for example. In particular, the moderate dispersion NZDSF 36 utilized in the systems 32, 32a broadly and preferably have total dispersion at 1550 nm of between about 5 and 14 ps/nm/km and total dispersion slope of the transmission fiber 36 in the systems 32, 32a at 1550 nm is preferably less than 0.08 ps/nm$^2$/km at 1550 nm. More preferably, the dispersion slope is between about 0.035 and 0.07 ps/nm$^2$/km at 1550 nm; and the kappa for the transmission fiber is preferably between about 90 and 160 nm at 1550 nm. The moderate dispersion NZDSF 36 preferably has a refractive index profile having a core, moat, and ring structure wherein the core has a positive delta, and the moat preferably has a positive or zero delta, but which may be negative in some embodiments. The ring preferably has a positive delta. The fiber 36 preferably exhibits a zero dispersion wavelength, $\lambda_0$, between about 1350 and 1480 nm and preferably has an effective area at 1550 nm of greater than about 45 $\mu$m$^2$; more preferably greater than 60 $\mu$m$^2$; and most preferably between about 50 and 75 $\mu$m$^2$. It should be recognized that although the core, moat, ring structure is preferred for the moderate dispersion NZDSF 36, other profile structures are contemplated as well, such as core, moat structures or designs having a solitary single core, provided that the broadest dispersion, dispersion slope and $\lambda_0$ properties mentioned above are met. Examples of this type of transmission fiber are taught in U.S. Pat. Nos. 6,628,873; U.S. 6,614,973; U.S. 6,612,756; U.S. 6,577,800; U.S. 6,535,676; U.S. 6,507,689; U.S. 6,453,101; U.S. 6,396,987; U.S. 5,546,177; US 2003/81,921; US 2003/21,562; US 2002/197,036; US 2002/168,159; US 2002/97,971; and US 2002/12,509 for example.

Figure 16:
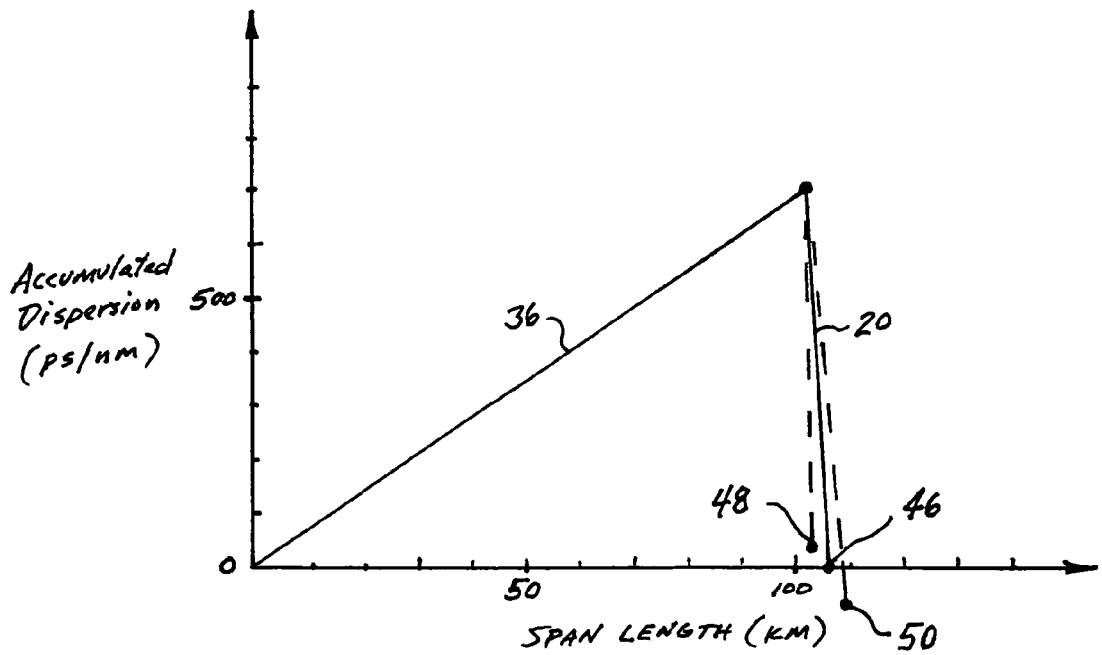
FIG. 16 is a graph of accumulated dispersion (ps/nm) versus span length (km) for an example system according to further embodiments of the invention.

In accordance with system embodiments of the invention, the dispersion compensating fiber 20 is optically coupled to the transmission fiber 36 and also, preferably, to one or more amplifiers (or amplifier stages) 42, and the fiber 20 is selected such that the total negative dispersion generated thereby is of a amount sufficient to preferably substantially compensate for the accumulated dispersion of the span. The term "substantially compensate" means the dispersion compensation provided in the span by the dispersion compensating fiber 20 is of such a magnitude that the dispersion at the end of the span (at the end of the span including the length of transmission fiber 36) is made to be approximately zero at 1550 nm as illustrated by point 46 in FIG. 16. "Substantially compensate" also includes conditions where the dispersion of the span is intentionally slightly (by as much as 5 percent) under compensated for (see point 48) or over compensated for (point 50), for example at any wavelength within the operating wavelength band. FIG. 2 illustrates a single fiber span (including the transmission fiber 36 and dispersion compensating fiber 20) connected to and optically coupled between a transmitter 40 and receiver 44. In contrast to system 32, the system 32a and shown in FIG. 3 includes coupling to a repeater 42 and another length of transmission fiber 36b, such that the system includes multiple spans of transmission fiber 36, 36b wherein each span preferably includes a length of the dispersion compensating fiber 20 for accumulated compensating dispersion therein. The transmission systems 32, 32a may also include other conventional optical components such as connectors, couplers, etc. and, in some embodiments, may include a short length of trimming fiber to aid in trimming the slope of the span.

In accordance with another embodiment of the invention, the dispersion compensating fiber 20 may be included in a dispersion compensating module 38 by winding the dispersion compensating fiber 20 onto a flanged spool or reel and/or otherwise packaging the fiber in a suitable enclosure. Optionally, the dispersion compensating fiber 20 may be cabled, serially coupled to the transmission and laid out lengthwise (as opposed to winding on a spool) and, therefore, may contribute to the overall span length. As shown in FIGS. 2 and 3, the Xs connote splices or connectors optically coupling the respective system components. It should be recognized that although the systems described herein are unidirectional, that the dispersion compensating optical fiber 20 described herein may be utilized in optical systems that are multidirectional as well.

By way of example, and not to be considered limiting, a length of about 2.5–7.0 km of the dispersion compensating fiber 20 in accordance with the invention may substantially compensate for the built up dispersion of approximately 100 km of the moderate dispersion NZDS transmission fiber 36 described above. In addition, the residual dispersion amplitudes for such a system 32, 32a over a first operating wavelength band (1525 to 1565 nm) is preferably less than +/−10 ps/nm per 100 km of the transmission fiber 36, and in some embodiments, less than +/−7 ps/nm per 100 km of the transmission fiber 36. The residual dispersion amplitude of the system 32, 32a over a second operating wavelength band (1525 to 1625 nm) is preferably less than +/−20 ps/nm per 100 km of the transmission fiber 36, and in some embodiments, less than +/−15 ps/nm per 100 km of the transmission fiber 36. Table 3 below illustrates the system residual dispersion amplitude over the respective wavelength band for each system example 1–10. As should be apparent, the dispersion compensating fibers 20 in accordance with the invention have excellent utility for minimizing system residual dispersion over the operating wavelength band (at least 1525–1565 nm and in some cases 1525–1625 nm) in systems including moderate dispersion NZDSF 36.

TABLE 3

Residual Dispersion for Various Fiber Combinations

| SYSTEM EX. | FIBER EX. | L$_{TRANS}$ (km) | TRANS FIBER | L$_{DCF}$ (km) | OPT. BAND | +/− RESIDUAL DISPERSION (1525–1565 NM) (ps/nm per 100 km) |
|---|---|---|---|---|---|---|
| 1 | A | 100 | D1 | 3.06 | C | +/−6 |
| 2 | B | 100 | D1 | 3.23 | C + L | +/−10 |
| 3 | C | 100 | D2 | 4.90 | C | +/−7 |
| 4 | D | 100 | D2 | 5.78 | C | +/−7 |
| 5 | E | 100 | D4 | 5.41 | C | +/−7 |

TABLE 3-continued

Residual Dispersion for Various Fiber Combinations

| SYSTEM EX. | FIBER EX. | L$_{TRANS}$ (km) | TRANS FIBER | L$_{DCF}$ (km) | OPT. BAND | +/− RESIDUAL DISPERSION (1525–1565 NM) (ps/nm per 100 km) |
|---|---|---|---|---|---|---|
| 6 | F | 100 | D4 | 6.09 | C | +/−7 |
| 7 | G | 100 | D5 | 5.89 | C | +/−4 |
| 8 | H | 100 | D2 | 4.67 | C + L | +/−14 |
| 9 | I | 100 | D4 | 5.99 | C + L | +/−13 |
| 10 | H | 100 | D3 | 6.08 | C + L | +/−17 |

Figure 17:
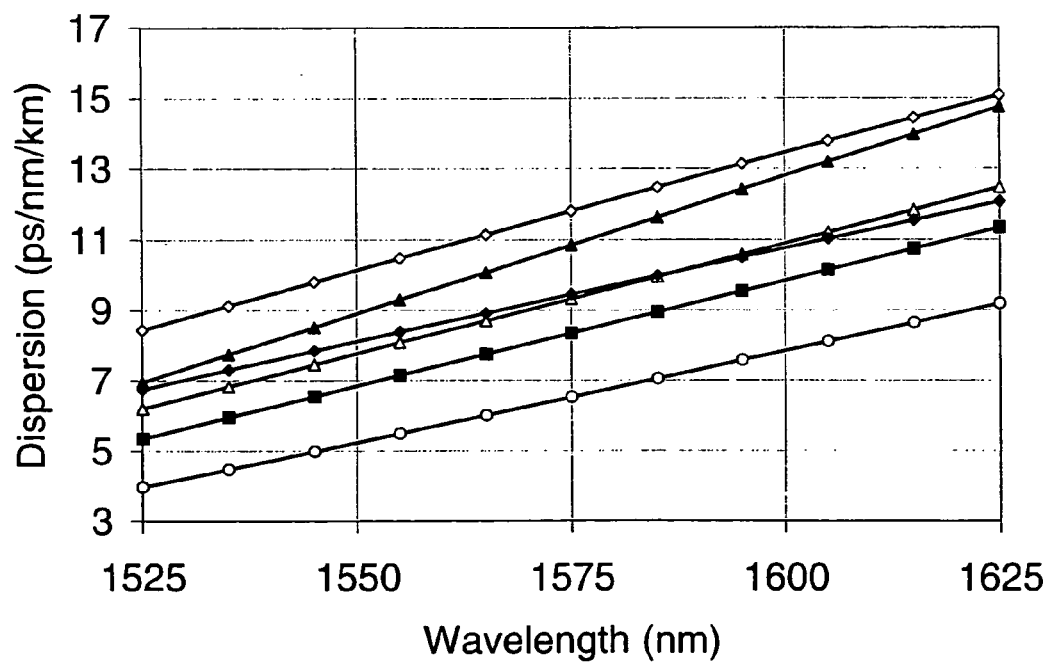
FIG. 17 is a graph of dispersion (ps/nm/km) versus wavelength (nm) for various moderate dispersion transmission fibers which may be utilized in the system according to further embodiments of the invention.
Figure 18:
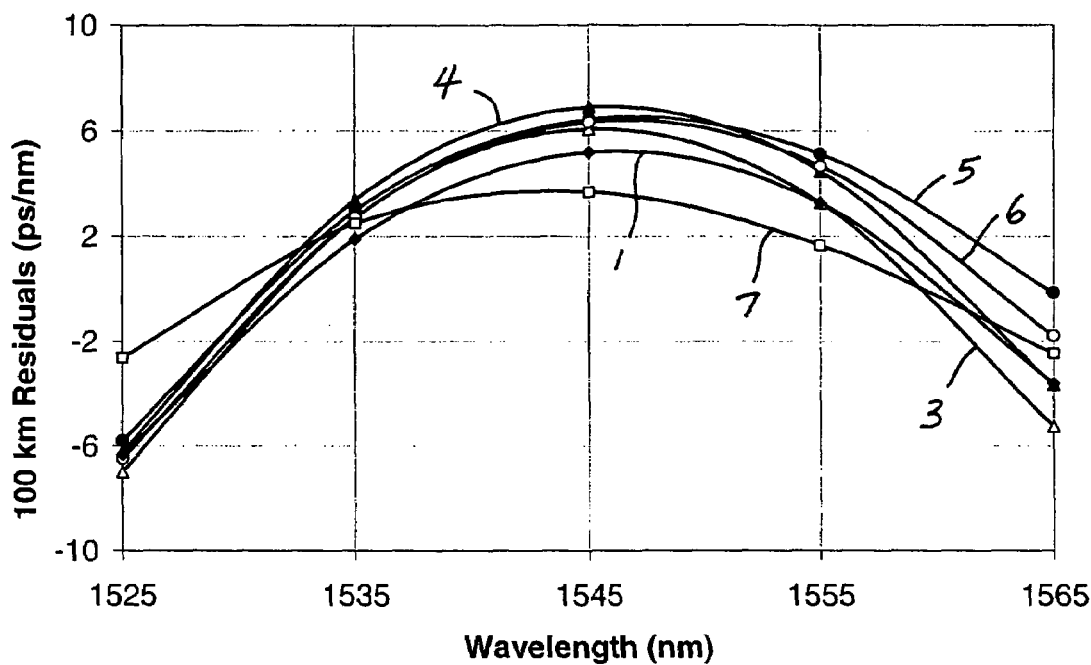
FIGS. 18 and 19 are graphs of residual dispersion (ps/nm) versus wavelength (nm) for various systems including fiber examples A–I according to embodiments of the invention.
Figure 19:
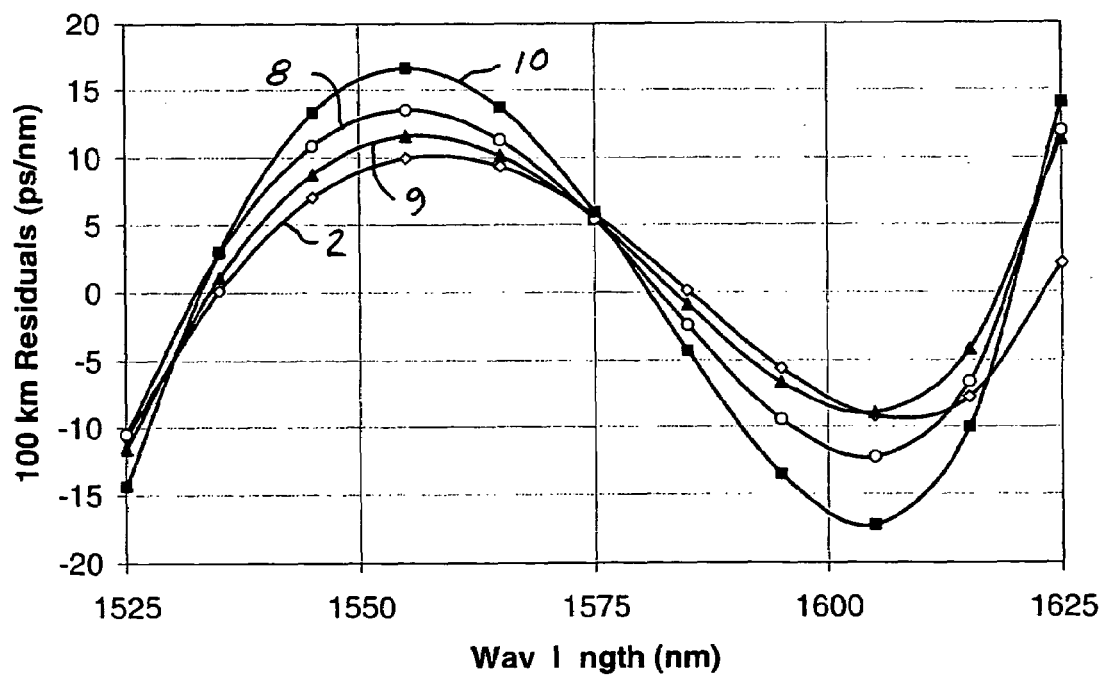

FIGS. 18 and 19 illustrate plots of calculated residual dispersion in ps/nm versus wavelength for various combinations of a 100 km length of various moderate dispersion NZDSF 36. In particular, the various NZDSF 36 have dispersions at 1550 nm as shown in FIG. 17 and as outlined in Table 4 below. The various NZDSF 36 are included in a span and are optically coupled to the various examples (A–I) of the dispersion compensating fiber 20. Table 3 above reveals the various combinations that were simulated with each respective plot being labeled with the identifying example number 1–10. Table 4 below illustrates the properties of the various moderate dispersion NZDSF 36 employed in the various systems.

TABLE 4

Transmission Fiber Properties

| TRANS. FIBER Ex. | DISPERSION @ 1550 NM (ps/nm/km) | DISPERSION SLOPE @ 1550 NM (ps/nm$^2$/km) | KAPPA @ 1550 NM (nm) |
|---|---|---|---|
| D1 | 5.24 | 0.051 | 102 |
| D2 | 6.85 | 0.060 | 114 |
| D3 | 7.77 | 0.062 | 124 |
| D4 | 8.12 | 0.054 | 151 |
| D5 | 8.90 | 0.078 | 114 |
| D6 | 10.14 | 0.067 | 151 |

Figure 20:
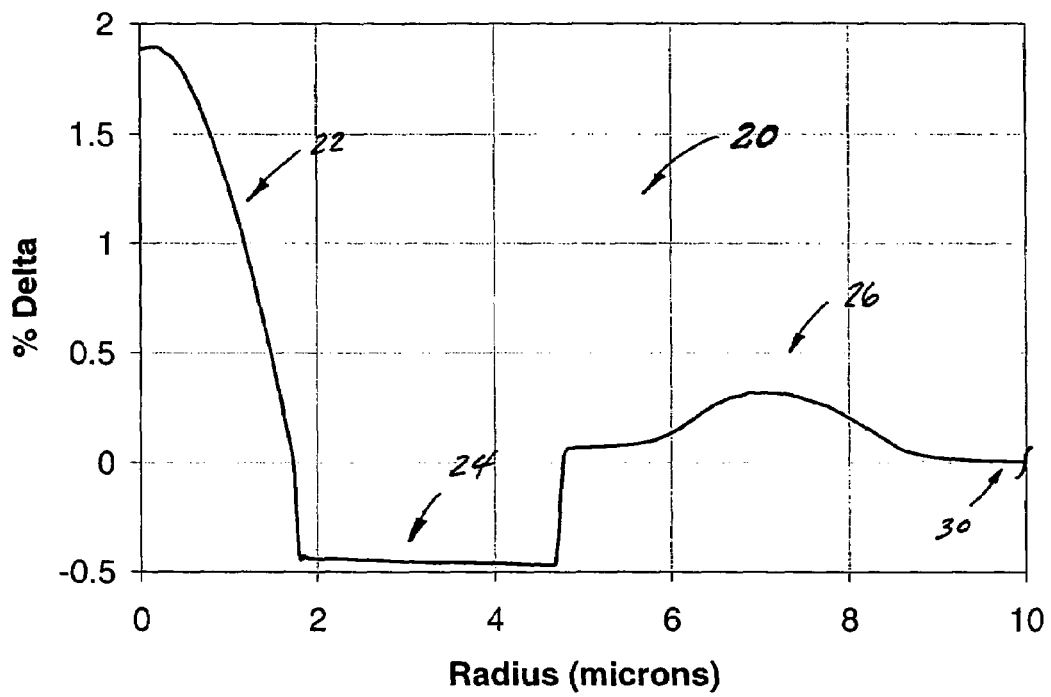
FIG. 20 is a plot of a relative refractive index profile of an actual experimental embodiment of the dispersion compensating fiber in accordance with the invention.
Figure 21:
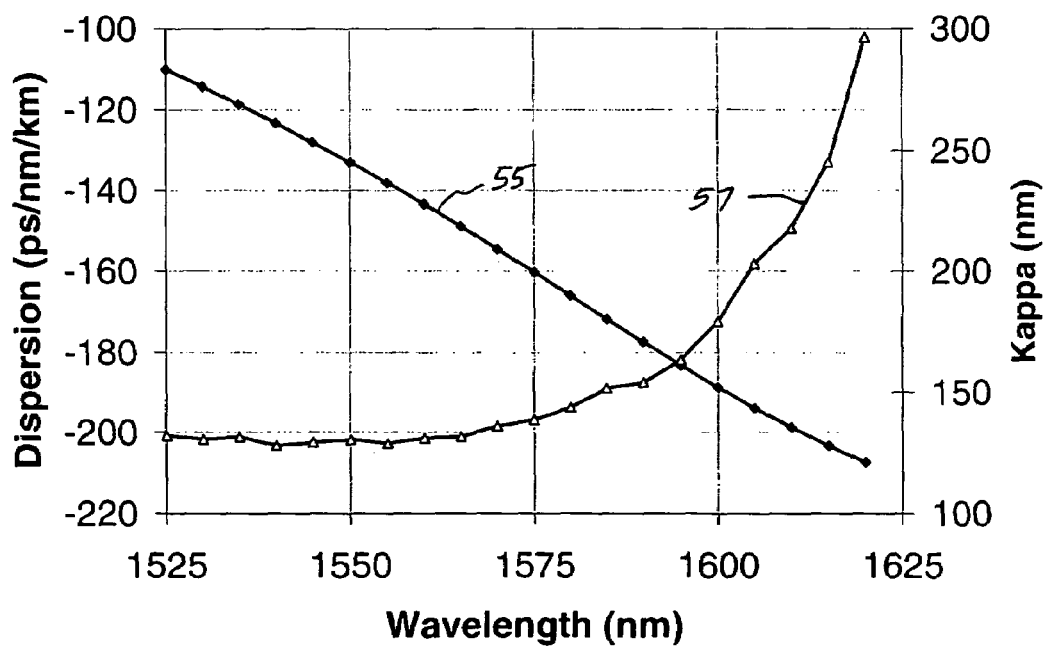
FIG. 21 is a graph of dispersion and kappa versus wavelength (nm) for the dispersion compensating fiber of FIG. 20 according to the invention.

An experimental prototype fiber 20 in accordance with embodiment of the invention was manufactured and an estimate of its relative refractive index thereof is shown in FIG. 19. The relative refractive index shown in FIG. 19 is an estimate of the fiber profile based upon the actual measured optical parameters of the fiber perform from which the fiber was drawn. The fiber 20 includes a central core segment 22, moat segment 24, ring segment 26 and clad layer as heretofore described. The fiber's attributes were also measured. Accordingly, the actual fiber 20 had a measured attenuation at 1550 nm of 0.64 dB/km, a measured mode field diameter of 4.69 μm at 1550 nm, measured two meter fiber cutoff of 1649 nm, measured cabled cutoff of 1451 nm, and measured pin array at 1550 nm of 6.1 dB/km. The fiber 20 had a diameter of 125 microns and was drawn at a speed of about 9 m/s and at a draw tension of about 150 grams. A plot of measured data is shown in FIG. 20 illustrating dispersion 55 and kappa 57 over the wavelength band from about 1525 to 1620 nm. It should be recognized that the example fiber 20 of FIG. 20 exhibits total dispersion at 1550 m of −133 ps/nm/km; total dispersion slope at 1550 nm of −1.02 ps/nm$^2$/km; and kappa at 1550 nm of 130.2 nm.

Regarding fabrication methods, the dispersion compensating fiber 20 may be constructed via a variety of methods including, but in no way limited to, vapor axial deposition (VAD), modified chemical vapor deposition (MCVD), plasma chemical vapor deposition (PCVD), and outside vapor deposition (OVD). It will be apparent to those skilled in the art that various modifications and variations can be made to the present invention without departing from the scope of the invention. Thus it is intended that the present invention cover the modifications and variations of this invention provided they come within the scope of the appended claims and their equivalents.

What is claimed is:

1. A dispersion compensating optical fiber, comprising:
a relative refractive index profile having
a central core segment with a positive relative refractive index ($\Delta_1$) and a core outer radius ($r_1$),
a moat segment surrounding the central core segment having negative relative refractive index ($\Delta_2$) and a moat outer radius ($r_2$) wherein the relative refractive index ($\Delta_2$) is between −0.4 and −0.6%, and
a ring segment surrounding the moat segment having a positive relative refractive index ($\Delta_3$), a ring center radius ($r_3$) to a center of the ring segment wherein the relative refractive index profile results in
total dispersion of less than −114 ps/nm/km and greater than −143 ps/nm/km at 1550 nm, and
kappa, defined as the total dispersion at 1550 nm divided by total dispersion slope at 1550 nm, of between 96 and 150 nm.

2. The optical fiber of claim 1 further comprising a kappa, defined as the total dispersion at 1550 nm divided by the total dispersion slope at 1550 nm, of between 107 and 146 nm.

3. The optical fiber of claim 1 further comprising a kappa, defined as the total dispersion at 1550 nm divided by the total dispersion slope at 1550 nm, of between 113 and 127 nm.

4. The optical fiber of claim 1 wherein the total dispersion slope at 1550 nm is less than −0.7 ps/nm$^2$/km and greater than −1.5 ps/nm$^2$/km.

5. The optical fiber of claim 1 wherein the total dispersion at 1550 nm is less than −120 ps/nm/km and greater than −143 ps/nm/km.

6. The optical fiber of claim 5 wherein the total dispersion at 1550 nm is less than −120 ps/nm/km and greater than −138 ps/nm/km.

7. A dispersion compensating module including the dispersion compensating optical fiber of claim 1.

8. An optical fiber transmission system, comprising:
a single mode transmission fiber having a total dispersion between 5 and 14 ps/nm/km at 1550 nm; and
a dispersion compensating fiber optically coupled to the single mode transmission fiber; said dispersion compensating optical fiber, including:
a relative refractive index profile having
a central core segment with a positive relative refractive index ($\Delta_1$) and a core outer radius ($r_1$),
a moat segment surrounding the central core segment having negative relative refractive index ($\Delta_2$) and a moat outer radius ($r_2$), and
a ring segment surrounding the moat segment having a positive relative refractive index ($\Delta_3$), a ring center radius ($r_3$) to a center of the ring segment wherein the relative refractive index profile results in
total dispersion of less than −114 ps/nm/km and greater than −143 ps/nm/km at 1550 nm, and
kappa, defined as the total dispersion at 1550 nm divided by total dispersion slope at 1550 nm, of between 96 and 150 nm
wherein for all wavelengths within a transmission wavelength band between 1525 nm to 1565 nm, the transmission system exhibits a residual dispersion of less than ±10 ps/nm per 100 km of the single mode transmission fiber.

9. An optical fiber transmission system, comprising:
a single mode transmission fiber having a total dispersion between 5 and 14 ps/nm/km at 1550 nm; and
the dispersion compensating fiber of claim 1 optically coupled to the single mode transmission fiber;
wherein for all wavelengths within a transmission wavelength band between 1525 nm to 1625 nm, the transmission system exhibits a residual dispersion of less than ±20 ps/nm per 100 km of the single mode transmission fiber.

10. The optical fiber of claim 1 wherein
the core outer radius ($r_1$) of the central core segment is between 1.6 and 1.8 microns; and
the outer radius ($r_2$) of the moat segment is between 4.6 and 5.0 microns.

11. The optical fiber of claim 9 wherein
the center radius ($r_3$) of the ring segment is between 6.5 and 7.2 microns.

12. The optical fiber of claim 1 wherein the ring segment includes a ring width ($W_r$) measured at one-half the relative refractive index ($\Delta_3$) of the ring segment wherein the ring segment is offset from the moat outer radius ($r_2$) by a ring offset ($X_o$) of greater than 0.75 μm, wherein $X_o = r_3 - r_2 - Wr/2$.

13. The optical fiber of claim 1 further comprising a core/moat ratio, defined as the core radius ($r_1$) divided by the moat outer radius ($r_2$) of greater than 0.32.

14. A dispersion compensating optical fiber, comprising:
a relative refractive index profile having
a central core segment with a positive relative refractive index ($\Delta_1$) and a core outer radius ($r_1$),
a moat segment surrounding the central core segment having negative relative refractive index ($\Delta_2$) and a moat outer radius ($r_2$), and
a ring segment surrounding the moat segment having a positive relative refractive index ($\Delta_3$), a ring center radius ($r_3$) to a center of the ring segment wherein the relative refractive index profile results in
total dispersion of less than −114 ps/nm/km and greater than −143 ps/nm/km at 1550 nm,
kappa, defined as the total dispersion at 1550 nm divided by total dispersion slope at 1550 nm, of between 96 and 150 nm, and
an effective area ($A_{eff}$) at 1550 nm is greater than 15 μm$^2$.

15. The optical fiber of claim 1 wherein Δ1 is greater than 1.0% and less than 2.0%.

16. The optical fiber of claim 15 wherein Δ2 is less than −0.3%.

17. The optical fiber of claim 16 wherein Δ3 is greater than 0.3%.

18. The optical fiber of claim 1 further comprising a ring width (Wr) measured at one-half the relative refractive index ($\Delta_3$) of the ring segment of between 1.0 and 2.0 μm.

19. A dispersion compensating optical fiber, comprising:
a refractive index profile having
a central core segment with a relative refractive index ($\Delta_1$) between 2.0% and 1.5% and an outer radius ($r_1$) of between 1.6 and 1.8 μm, a moat segment surrounding the central core segment with a relative refractive index ($\Delta_2$) of between −0.4 and −0.6% and a moat outer radius ($r_2$) between 4.6 and 5.0 μm, and a ring segment surrounding the moat segment with a relative refractive index ($\Delta_3$) of between 0.3 and 0.6%, a ring radius ($r_3$) to a center of the ring segment of between 6.5 and 7.2 μm, and the refractive index profile results in a total dispersion of less than −114 ps/nm/km and greater than −143 ps/nm/km at a wavelength of 1550 nm, and a kappa, defined as the total dispersion at 1550 nm divided by the dispersion slope at 1550 nm, of between 96 and 150 nm.

20. A dispersion compensating optical fiber, comprising: a relative refractive index profile having a central core segment with a relative refractive index ($\Delta_1$) between 1.5% and 2.0% and an outer radius ($r_1$) of between 1.6 and 1.8 μm, a moat segment surrounding the central core segment with a relative refractive index ($\Delta_2$) of between −0.4 and −0.6% and a moat outer radius ($r_2$) between 4.6 and 5.0 μm, and a ring segment surrounding the moat segment with a relative refractive index ($\Delta_3$) of between 0.3 and 0.6%, a ring radius ($r_3$) to a center of the ring segment of between 6.5 and 7.2 μm, a ring width ($W_r$) measured at one-half the relative refractive index ($\Delta_3$) of the ring segment of between 1.0 and 2.0 μm and wherein the ring segment is offset from the moat outer radius ($r_2$) by a ring offset ($X_o$) between of between 1.0 and 1.7 μm wherein $X_o = r_3 - r_2 - W_r/2$, and the relative refractive index profile results in a total dispersion of less than −114 ps/nm/km and greater than −143 ps/nm/km at a wavelength of 1550 nm, a total dispersion slope of less than −0.7 and greater than −1.5 ps/nm$^2$/km at a wavelength of 1550 nm; and a kappa, defined as the total dispersion at 1550 nm divided by the dispersion slope at 1550 nm, of between 96 and 150 nm.

21. The optical fiber of claim 1 wherein the core outer radius ($r_1$) of the central core segment is between 1.6 and 1.8 microns.

* * * * *